United States Patent
Wan et al.

(10) Patent No.: US 11,302,947 B2
(45) Date of Patent: Apr. 12, 2022

(54) MEMBRANE ELECTRODE ASSEMBLY OF FUEL CELL AND PREPARATION METHOD THEREFOR

(71) Applicant: CRRC QINGDAO SIFANG CO., LTD., Shandong (CN)

(72) Inventors: Nianfang Wan, Shandong (CN); Sansan Ding, Shandong (CN); Wenchao Zhang, Shandong (CN); Kelei Li, Shandong (CN); Yankun Li, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 16/755,560

(22) PCT Filed: Nov. 5, 2018

(86) PCT No.: PCT/CN2018/113915
§ 371 (c)(1),
(2) Date: Apr. 10, 2020

(87) PCT Pub. No.: WO2019/086025
PCT Pub. Date: May 9, 2019

(65) Prior Publication Data
US 2021/0194029 A1    Jun. 24, 2021

(30) Foreign Application Priority Data

Nov. 6, 2017 (CN) .......................... 201711078834.4
Nov. 6, 2017 (CN) .......................... 201721466595.5

(51) Int. Cl.
*H01M 8/1004* (2016.01)
*H01M 4/88* (2006.01)

(52) U.S. Cl.
CPC ....... *H01M 8/1004* (2013.01); *H01M 4/8807* (2013.01); *H01M 4/8828* (2013.01); *H01M 4/8875* (2013.01)

(58) Field of Classification Search
None
See application file for complete search history.

(56) References Cited

U.S. PATENT DOCUMENTS

| 2009/0148752 A1 | 6/2009 | Ueda et al. |
| 2009/0181276 A1* | 7/2009 | Beutel ................ H01M 8/1069 429/480 |

(Continued)

FOREIGN PATENT DOCUMENTS

| CN | 107834088 A | 3/2018 |
| CN | 207490022 U | 6/2018 |

(Continued)

OTHER PUBLICATIONS

English translation of JP2009076423A (Year: 2009).*

(Continued)

*Primary Examiner* — Lucas J. O'Donnell
(74) *Attorney, Agent, or Firm* — Yue (Robert) Xu; Apex Attorneys at Law, LLP

(57) ABSTRACT

The present invention provides a membrane electrode assembly of a fuel cell, comprising a gas diffusion layer, a microporous layer, a catalytic layer, and an electrolyte membrane that are sequentially stacked. In the direction of an air flow path, the thickness of the microporous layer decreases progressively, the thickness of the catalytic layer increases progressively, and the total thickness of the microporous layer and the catalytic layer keeps consistent. The present application also provides a preparation method for the membrane electrode assembly of a fuel cell. The membrane electrode assembly of a fuel cell provided in the present application can balance water content of a gas inlet (Continued)

area and a gas outlet area of the fuel cell, and finally improves the stability of the fuel cell at different temperatures and humidity levels, thereby implementing functions such as improving the durability and decreasing a catalyst load.

11 Claims, 2 Drawing Sheets

(56) References Cited

U.S. PATENT DOCUMENTS

2009/0280377 A1 11/2009 Ueda et al.
2010/0099005 A1* 4/2010 Ren .................. H01M 8/083
429/432

FOREIGN PATENT DOCUMENTS

| JP | 2005317492 A | 11/2005 |
| JP | 2009076423 A | 4/2009 |
| JP | 2009129667 A | 6/2009 |
| JP | 2013225398 A | 10/2013 |

OTHER PUBLICATIONS

English translation of JP2013225398A (Year: 2013).*
International Search Report for PCT/CN2018/113915 dated Feb. 13, 2019, ISA/CN.
Search Report dated Jul. 16, 2021 for European patent application No. 18874021.1.

* cited by examiner

MEMBRANE ELECTRODE ASSEMBLY OF FUEL CELL AND PREPARATION METHOD THEREFOR

The present application is the national phase of International Application No. PCT/CN2018/113915, titled "MEMBRANE ELECTRODE ASSEMBLY OF FUEL CELL AND PREPARATION METHOD THEREFOR", which claims the priority to Chinese Patent Application No. 201711078834.4, titled "MEMBRANE ELECTRODE ASSEMBLY OF FUEL CELL AND PREPARATION METHOD THEREFOR", filed on Nov. 6, 2017 with the Chinese Patent Office, and the priority to Chinese Patent Application No. 201721466595.5, titled "MEMBRANE ELECTRODE ASSEMBLY OF FUEL CELL", filed on Nov. 6, 2017 with the Chinese Patent Office, the entire disclosures thereof are incorporated herein by reference.

FIELD

The present disclosure relates to the technical field of fuel cells, and in particular to a membrane electrode assembly of a fuel cell and a method for preparing the membrane electrode assembly of a fuel cell.

BACKGROUND

Fuel cells have broad development prospects in fields of transportation, backup power supply and distributed power station due to their advantages of high energy conversion efficiency, low emission and no pollution. A typical fuel cell unit consists of an electrolyte membrane (which is a proton exchange membrane generally), a catalytic electrode for a cathode and an anode, a gas diffusion layer and a bipolar plate. A gas diffusion medium in the fuel cell is usually made of a conductive porous substrate such as carbon fiber paper or carbon cloth, and a microporous layer is attached to the gas diffusion medium. The microporous layer usually includes carbon powder and hydrophobic fluoropolymer, and has functions of drainage, ventilation and enhancing electron transport. The microporous layer plays an important role in water management in the fuel cell.

The water management in the fuel cell is very important. A shortage of water may result in a high proton transport impedance of the electrolyte membrane and low activity of an electrode, thereby resulting in a low power output. High water content may result in flooding of the electrode and high transport resistance to oxygen gas and fuel, thereby also resulting in performance reduction. Due to having a relatively high power output of a vehicle fuel cell, an electrode of the vehicle fuel cell generally has a large area up to hundreds of square centimeters. For a fuel cell, especially a fuel cell with a large size, imbalance of water content in a membrane electrode, relative humidity of the gas and oxygen concentration in different areas of the electrode may result in an imbalance distribution of current density, which may affect power density and durability.

Generally, at an inlet of the fuel cell, the air is relatively dry and oxygen partial pressure is high. At an outlet of the fuel cell, the air is relatively humid and the oxygen partial pressure is low. Such an imbalance may be aggravated at different operating temperatures. For example, the shortage of water may occur at a high temperature and a flooding may occur at a low temperature. In order to increase relative humidity of the air at the inlet, the air is generally pre-humidified by a humidifier before being introduced into a fuel cell stack. The humidifier is generally large in size, which increases a system volume and system weight. Furthermore, the problem of imbalance distribution of water and oxygen at different areas in the fuel cell, especially in the fuel cell with a large size, cannot be solved by a humidifier.

Chinese Patent Application No. 201110293005.4 provides an electrode of a fuel cell with gradient performance and a method for preparing the same. First, at least two electrode slurry mixtures having different components are prepared. The at least two electrode slurry mixtures are deposited on a substrate of the gas diffusion layer to form at least two electrode layers, which are combined to form a combined electrode such that an average performance of the combined electrode layer varies with the substrate. The performance includes a membrane equivalent weight, gas permeability of a diffusion medium, a ratio of ionomer to carbon, a catalyst loading, porosity, or a combination thereof.

U.S. Pat. No. 8,945,790 provides a microporous layer structure, which has hydrophilic pores, hydrophobic pores, and boreholes. The hydrophilic pores and the hydrophobic pores each has a complex diameter ranging from 0.02 micrometers to 0.5 micrometers and the boreholes each has a complex diameter ranging from 0.5 micrometers to 100 micrometers. The hydrophilic pores increase water storage capability, such that water content of the membrane under a dry and high temperature condition can be increased. Further, the hydrophilic pores increase a phase transportation point from liquid to gas, which facilitates heat dissipation. The hydrophobic pores mimic secondary pores in a catalytic layer, thereby facilitating transport of reaction gas and water vapor. The boreholes facilitate transport of liquid water through a capillary force.

In the above solutions, either a complicated preparation process or a large number of to-be-controlled parameters is involved, which is adverse to mass production, or, the improvement of water management of the fuel cell is poor, thereby affecting performance of the fuel cell.

SUMMARY

In order to solve the technical problem of imbalance distribution of water and oxygen gas at different areas in a fuel cell, especially in a fuel cell with a large size in the prior art, a membrane electrode assembly with better performance in water management is provided according to the present disclosure, so as to improve stability of the fuel cell in various humidity conditions, improve durability, and reduce dosage of a catalyst.

In view of this, a membrane electrode assembly of a fuel cell is provided according to the present disclosure, which comprises a gas diffusion layer, a microporous layer, a catalytic layer and an electrolyte membrane that are sequentially stacked, wherein, in the direction of air flow, thickness of the microporous layer decreases progressively, thickness of the catalytic layer increases progressively, and the total thickness of the microporous layer and the catalytic layer is uniform. The catalytic layer is also referred to as a catalytic electrode layer herein.

Preferably, the total thickness of the microporous layer and the catalytic layer ranges from 20 μm to 65 μm.

Preferably, the microporous layer has a thickness ranging from 30 μm to 55 μm at the air inlet and has a thickness ranging from 20 μm to 40 μm at the air outlet. The catalytic layer has a thickness ranging from 1 μm to 10 μm at the air inlet and has a thickness ranging from 5 μm to 30 μm at the air outlet.

Preferably, the difference between the thickness of the catalytic layer at the air outlet and the thickness of the catalytic layer at the air inlet ranges from 1 μm to 20 μm. The difference between the thickness of the microporous layer at the air inlet and the thickness of the microporous layer at the air outlet ranges from 1 μm to 20 μm.

The present disclosure further discloses a method for preparing the membrane electrode assembly of a fuel cell, comprising the following steps, A), preparing a microporous layer slurry mixture and a catalytic layer slurry mixture;

B), coating surface of a gas diffusion layer subjected to hydrophobic treatment with the microporous layer slurry mixture to obtain the microporous layer after heat treatment; and coating surface of the electrolyte membrane with the catalytic layer slurry mixture to obtain a membrane/electrode combination after heat treatment, wherein by controlling coating process for the microporous layer and coating process for the membrane/electrode combination respectively, in the direction of air flow, the thickness of the microporous layer decreases progressively, the thickness of the catalytic layer of the membrane/electrode combination increases progressively, and the total thickness of the microporous layer and the catalytic layer is uniform; and C), preparing the gas diffusion layer coated with the microporous layer and the membrane/electrode combination coated with the catalytic layer into the membrane electrode assembly.

The present disclosure further discloses a method for preparing the membrane electrode assembly of a fuel cell, which comprises the following steps, A), preparing microporous layer slurry mixture and a catalytic layer slurry mixture;

B), coating surface of a gas diffusion layer subjected to hydrophobic treatment with the microporous layer slurry mixture to obtain a microporous layer after heat treatment; and coating surface of the microporous layer with the catalytic layer slurry mixture to obtain a catalytic layer after heat treatment, wherein by controlling coating process for the microporous layer and coating process for the catalytic layer, in the direction of air flow, the thickness of the microporous layer decreases progressively, the thickness of the catalytic layer increases progressively, and the total thickness of the microporous layer and the catalytic layer is uniform; and C), preparing the gas diffusion layer, coated with the microporous layer and the catalytic layer, and the electrolyte membrane into the membrane electrode assembly.

Preferably, the microporous layer slurry mixture consists of carbon powder, adhesive agent, dispersant and solvent. The catalytic layer consists of carbon supported platinum catalyst, ionomer, dispersant and solvent.

Preferably, the coating tool for performing the coating process for the microporous layer is a coater with a slit or a spray head, or a scraper; and the coating tool for performing the coating process for the catalytic layer is a coater with a slit or a spray head, or a scraper.

Preferably, in a process of preparing the microporous layer, the thickness of the microporous layer is decreased progressively in the direction of air flow by changing heights of the two ends of the scraper; and in a process of preparing the catalytic layer, the scraper is inclined in a direction opposite to that in the process of preparing the microporous layer.

Preferably, the membrane electrode assembly is prepared by hot pressing or bonding.

A membrane electrode assembly of a fuel cell is provided according to the present disclosure, which comprises a gas diffusion layer, a microporous layer, a catalytic layer and an electrolyte membrane that are sequentially stacked, wherein in the direction of air flow, the thickness of the microporous layer decreases progressively, the thickness of the catalytic layer increases progressively, and the total thickness of the microporous layer and the catalytic layer is uniform. At the air inlet, due to water retention function of a thick microporous layer, water is difficult to escape through the microporous layer, thereby increasing water content at the air inlet and reducing requirement for air pre-humidifying. Although the catalytic layer is thin at the air inlet, performance reduction caused by decrease in dosage of catalyst can be compensated due to a relative high oxygen concentration at the air inlet. At the air outlet, due to the thin microporous layer, the resistance to oxygen transport is small and water easily escapes, thereby decreasing flooding phenomenon; the catalytic layer is relatively thick, and a high dosage of catalyst can provide more active reaction sites, thereby reducing negative effect on performance caused by low oxygen concentration and facilitating maintaining of performance at the air outlet. In this way, water management and material transport can be improved by adjusting gradient distribution of the microporous layer and the catalytic layer in thickness, thereby facilitating the balance of water content and oxygen concentration of entire region in the cell, improving the uniform distribution of current density, improving stability of the cell under various temperature and humidity conditions, reducing cost to a certain extent and improving durability.

DETAILED DESCRIPTION OF EMBODIMENTS

For a further understanding of the present disclosure, preferred embodiments of the present disclosure are described below in conjunction with examples. However, it should be understood that these descriptions are only for further describing features and advantages of the present disclosure rather than limiting the claims of the present disclosure.

In view of the problem of poor water management in a fuel cell according to the prior art, a membrane electrode assembly is provided according to the present disclosure. The membrane electrode assembly comprises a microporous layer and a catalytic layer, wherein in the direction of air flow, the thickness of each of the microporous layer and the catalytic layer has a gradient distribution, the total thickness of the microporous layer and the catalytic layer is uniform. The microporous layer at the air inlet is thicker than that at the air outlet, while the catalytic layer at the air inlet is thinner than that at the air outlet. With the membrane electrode assembly, water content of a fuel cell at the air inlet and the air outlet can be balanced, distribution of current density of a fuel cell with big size can be improved, stability of the fuel cell under various temperature and humidity conditions can be improved, and functions such as durability can be improved. In particular, the membrane electrode assembly according to the present disclosure comprises a gas diffusion layer, a microporous layer, a catalytic layer and an electrolyte membrane that are sequentially stacked, wherein in the direction of air flow, the thickness of the microporous layer decreases progressively, the thickness of the catalytic layer increases progressively, and the total thickness of the microporous layer and the catalytic layer is uniform.

Figure 1:
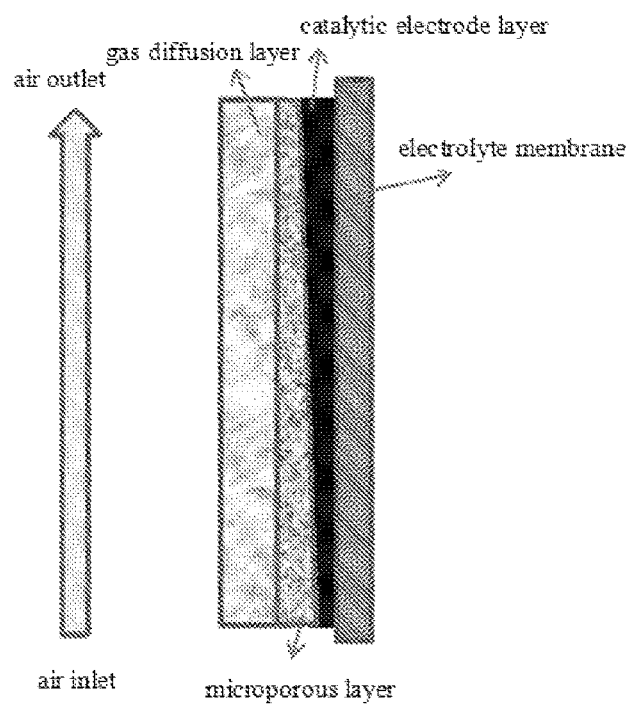
FIG. 1 shows a membrane electrode assembly of a fuel cell according to the present disclosure.

The present disclosure provides a membrane electrode assembly with a gradient variation, which comprises a gas diffusion layer, a microporous layer, a catalytic layer and an electrolyte membrane that are sequentially stacked, wherein the microporous layer and the catalytic layer are changed in gradient, that is, in the direction of air flow, the thickness of the microporous layer decreases progressively, and the thickness of the catalytic layer increases progressively, and the total thickness of the microporous layer and the catalytic layer should be uniform, that is, in the direction of air flow, the total thickness of the microporous layer and the catalytic layer remains unchanged. Reference is made to FIG. 1, which is a schematic structural diagram of a membrane electrode assembly according to the present disclosure. As can be seen clearly from FIG. 1, the microporous layer and the catalytic layer are between the gas diffusion layer and the electrolyte membrane, the thickness of the microporous layer is changed in gradient, and the thickness of the catalytic layer is changed in gradient. With the increasing or decreasing gradient distribution according to the present disclosure, water can be uniformly distributed in a direction from the air inlet to the air outlet, thereby achieving a better effect.

In some specific embodiments, the total thickness of the microporous layer and the catalytic layer ranges from 20 µm to 65 µm; more preferably, the total thickness of the microporous layer and the catalytic layer is 45 µm. At the air inlet, the thickness of the microporous layer ranges from 30 µm to 55 µm. In an embodiment, the thickness of the microporous layer is 40 µm at the air inlet. At the air outlet, the thickness of the microporous layer ranges from 20 µm to 40 µm. In an embodiment, the thickness of the microporous layer is 30 µm at the air outlet. At the air inlet, the thickness of the catalytic layer ranges from 1 µm to 10 µm. In an embodiment, the thickness of the catalytic layer is 5 µm at the air inlet. At the air outlet, the thickness of the catalytic layer ranges from 5 µm to 30 µm. In an embodiment, the thickness of the catalytic layer is 15 µm at the air outlet. In some embodiments, the difference between the thickness of the catalytic layer at the air outlet and that at the air inlet ranges from 1 µm to 20 µm, the difference between the thickness of the microporous layer at the air inlet and that at the air outlet ranges from 1 µm to 20 µm.

The present disclosure further provides a method for preparing the membrane electrode assembly of a fuel cell, which comprises the following steps, A), preparing a microporous layer slurry mixture and a catalytic layer slurry mixture;

B), coating surface of a gas diffusion layer subjected to hydrophobic treatment with the microporous layer slurry mixture to obtain the microporous layer after heat treatment; and coating surface of the electrolyte membrane with the catalytic layer slurry mixture to obtain a membrane/electrode combination after heat treatment, wherein by controlling coating process for the microporous layer and coating process for the membrane/electrode combination respectively, in the direction of air flow, the thickness of the microporous layer decreases progressively, the thickness of the catalytic layer of the membrane/electrode combination increases progressively, and the total thickness of the microporous layer and the catalytic layer is uniform; and C), preparing the gas diffusion layer coated with the microporous layer and the membrane/electrode combination coated with the catalytic layer into the membrane electrode assembly.

The present disclosure further provides another method for preparing the membrane electrode assembly of a fuel cell, which comprises the following steps, A), preparing microporous layer slurry mixture and a catalytic layer slurry mixture;

B), coating surface of a gas diffusion layer subjected to hydrophobic treatment with the microporous layer slurry mixture to obtain a microporous layer after heat treatment; and coating surface of the microporous layer with the catalytic layer slurry mixture to obtain a catalytic layer after heat treatment, wherein by controlling coating process for the microporous layer and coating process for the catalytic layer, in the direction of air flow, the thickness of the microporous layer decreases progressively, the thickness of the catalytic layer increases progressively, and the total thickness of the microporous layer and the catalytic layer is uniform; and C), preparing the gas diffusion layer, coated with the microporous layer and the catalytic layer, and the electrolyte membrane into the membrane electrode assembly.

In the above two methods for preparing the membrane electrode assembly, two slurry mixtures are firstly prepared, namely, the microporous layer slurry mixture and the catalytic layer slurry mixture. The microporous layer slurry mixture and the catalytic layer slurry mixture are both mixtures of components well known to those skilled in the art. Specifically, the microporous layer slurry mixture consists of carbon powder, adhesive agent, dispersant and solvent, the catalytic layer consists of carbon supported platinum catalyst, ionomer, dispersant and solvent. As for the proportional relationship of the above components, they are not limited herein and the ratios thereof are well known to those skilled in the art.

According to the present disclosure, the surface of the gas diffusion layer subjected to hydrophobic treatment is coated with the microporous layer slurry mixture, to obtain the microporous layer after heat treatment. After the microporous layer is obtained, there are two methods based on different membrane layers coated with the catalytic layer slurry mixture. That is, the catalytic layer slurry mixture may be coated on the surface of the electrolyte membrane, or the catalytic layer slurry mixture may be coated on the surface of the prepared microporous layer. By either of the two methods, the purpose is to make the microporous layer and the catalytic layer to meet the above requirements of structure. In the process of coating, the above requirement of structure for the obtained microporous layer and the catalytic layer is met by controlling the coating process. Specifically, multiple coating processes may be performed to prepare the microporous layer and the catalytic layer with gradient distribution in thickness. The coating tool for the microporous layer or the catalytic layer is a coater with a slit or a spray head, or a scraper. In the case that the coating tool is a scraper, the thickness gradient may be controlled by changing heights of the two ends of the scraper. For example, the scraper on one end is higher than the other end when applying the microporous layer slurry. An inclination direction of the scraper is changed when applying the catalytic layer slurry, so as to be opposite to that when applying the microporous layer slurry. In this way, the total thickness of the microporous layer and the catalytic layer is uniform. In the case that the coating tool is a coater with a slit, coating thicknesses of different slurry mixtures may be controlled by adjusting the slit at one end to be wider than that at the other end.

After the catalytic layer and the microporous layer are obtained, they are combined to obtain the membrane electrode assembly. The membrane electrode assembly may be formed by hot pressing or bonding, which is not limited herein. The membrane electrode assembly may be assembled outside or inside the cell. For the first method mentioned above, the membrane electrode assembly being assembled outside the cell means directly assembling the microporous layer and the catalytic layer by hot pressing or bonding, and the membrane electrode assembly being assembled inside the cell means packing the gas diffusion layer coated with the microporous layer and the membrane/electrode combination coated with the catalytic layer into the cell in a direction of having a uniform total thickness and applying a certain pressing force. For the second method mentioned above, the membrane electrode assembly being assembled outside the cell is the same as in the first method, and the membrane electrode assembly being assembled inside the cell means packing the electrolyte membrane and the diffusion layer coated with the microporous layer and the catalytic layer into the cell in a direction of having a uniform total thickness and apply a pressing force. The present disclosure provides a membrane electrode structure of a fuel cell with gradient distribution in thickness, so as to balance water content between the air inlet and the air outlet of the fuel cell, and reduce the imbalance of water content between the air inlet and the air outlet of the fuel cell especially a fuel cell with a large size, thereby improving distribution of current density of the fuel cell, increasing water retention of the electrode at a high temperature, decreasing a degree of air pre-humidifying, reducing a risk of flooding of electrode at a low temperature, reducing the dosage of metallic catalyst and improving durability.

In order to further understand the present disclosure, the microporous layer structure according to the present disclosure is described in detail below with reference to examples. The protection scope of the present disclosure is not limited by the following examples.

Example 1

A microporous layer dispersion liquid consisting of carbon powder, polytetrafluoroethylene emulsion, deionized water and a surfactant was subjected to ultrasonic dispersion and mechanical agitation to form a uniform microporous layer slurry, which was then coated on one side of the gas diffusion layer. The coating tool was a coater with a scraper. The thickness gradient from the air inlet to the air outlet was formed by changing heights of the scraper at both ends. In this case, the end of the scraper at the air inlet was higher than the other end of the scraper at the air outlet, and the slurry applied on the end at the air inlet was thicker than that applied on the other end of at the air outlet. A microporous layer was formed after heat treatment. This microporous layer had a gradient thickness from the air inlet to the air outlet. The thickness of the microporous layer at the air inlet was 40 µm, and the thickness of the microporous layer at the air outlet was 30 µm.

A catalyst layer electrode dispersion liquid consisting of carbon supported platinum catalyst, solvent, and ionomer liquid was subjected to ultrasonic dispersion and mechanical agitation to form a uniform slurry, which was then coated on the surface of the electrolyte membrane. The coating tool was a coater with a scraper. The thickness gradient from the air inlet to the air outlet was formed by changing heights of the scraper at both ends. In this case, the end of the scraper at the air inlet was lower than the other end of the scraper at the air outlet, and the slurry applied on the end at the air inlet was thinner than that applied on the other end of at the air outlet. A membrane/electrode combination having a catalyst layer was formed after heat treatment. The catalyst layer had a gradient thickness from the air inlet to the air outlet. The thickness of the catalyst layer at the air inlet was 5 µm, and the thickness of the catalyst layer at the air outlet was 15 µm. By adjusting the reverse and consistence of inclination angle of the scraper from the air inlet to the air outlet when applying the microporous layer and the catalyst layer, the total thickness of the microporous layer and the catalyst layer was kept to be a consistent 45 um.

Example 2

A microporous layer dispersion liquid consisting of carbon powder, polytetrafluoroethylene emulsion, deionized water and a surfactant was subjected to ultrasonic dispersion and mechanical agitation to form a uniform microporous layer slurry, which was then coated on one side of the gas diffusion layer. The coating tool was a coater with a scraper. In this case, the end of the scraper at the air inlet had the same height with the other end of the scraper at the air outlet, such that a microporous layer having high water vapor permeability was formed after heat treatment. The microporous layer had a thickness of 35 µm. A catalyst layer electrode dispersion liquid consisting of carbon supported platinum catalyst, solvent, and ionomer liquid was subjected to ultrasonic dispersion and mechanical agitation to form a uniform slurry, which was then coated on the surface of the electrolyte membrane. The coating tool was a coater with a scraper. In this case, the end of the scraper at the air inlet had the same height with the other end of the scraper at the air outlet, such that a catalytic layer having a uniform thickness was formed after heat treatment and the thickness was 10 µm.

Example 3

A microporous layer dispersion liquid consisting of carbon powder, polytetrafluoroethylene emulsion, deionized water and a surfactant was subjected to ultrasonic dispersion and mechanical agitation to form a uniform microporous layer slurry, which was then coated on one side of the gas diffusion layer. The coating tool was a coater with a scraper. In this case, the end of the scraper at the air inlet had the same height with the other end of the scraper at the air outlet, such that a microporous layer with a uniform thickness having high water vapor permeability was formed after heat treatment. The thickness was 30 µm. A catalyst layer electrode dispersion liquid consisting of carbon supported platinum catalyst, solvent, and ionomer liquid was subjected to ultrasonic dispersion and mechanical agitation to form a uniform slurry, which was then coated on the surface of the electrolyte membrane. The coating tool was a coater with a scraper. In this case, the end of the scraper at the air inlet had the same height with the other end of the scraper at the air outlet, such that a catalytic layer having a uniform thickness was formed after heat treatment and the thickness was 15 µm.

Figure 2:
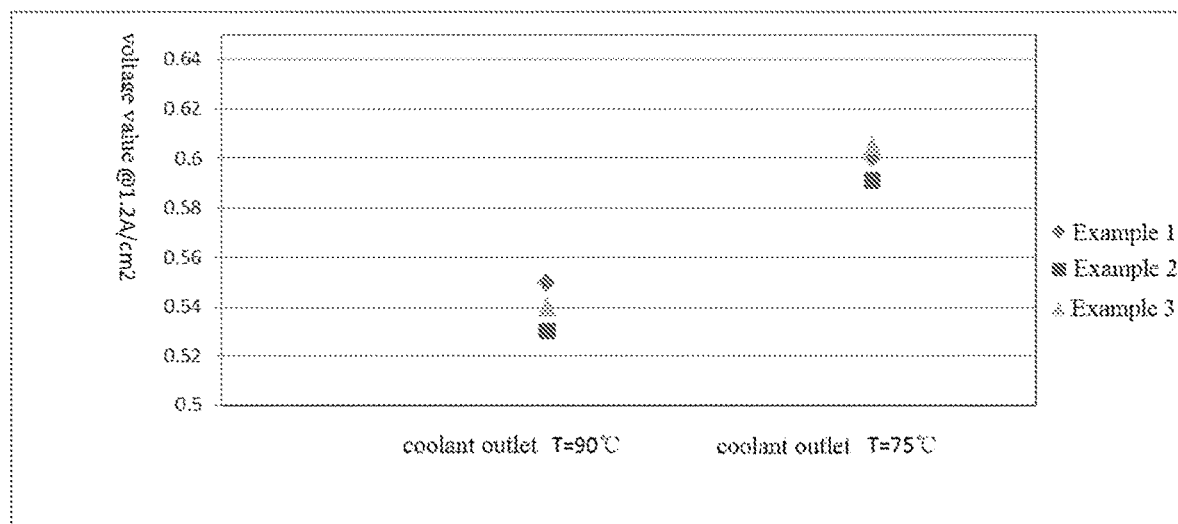
FIG. 2 is a schematic diagram showing comparison of performances of a cell formed by a membrane electrode assembly prepared according to an example of the present disclosure under a low humidity condition.
Figure 3:
FIG. 3 is a schematic diagram showing comparison of performances of a cell formed by a membrane electrode assembly prepared according to an example of the present disclosure under a high humidity condition.

The diffusion layer coated with the microporous layer and the membrane/electrode combination coated with the catalytic layer prepared in Example 1 to Example 3 were combined by hot pressing process to form a membrane electrode assembly. The prepared membrane electrode assembly was assembled into a test fixture of a fuel cell. Performance of the fuel cell under low humidity and high humidity was tested under certain conditions. The test results were as shown in FIG. 2 and FIG. 3. The test conditions in FIG. 2 were: inlet pressure of 200 KPa of the cathode, inlet RH of an anode and of an cathode were 30% and 42% respectively, and a stoichiometric ratio of the anode to the cathode was 2.0. As shown in FIG. 2, the fuel cell had an MEA with gradient performance, which showed a performance of about 20 mV or higher at 90° C., and had a similar performance at 75° C. In addition, the dosage of catalyst in Example 1 was lower than that in Example 3. At 90 or 75° C., higher and similar performance was showed. The test conditions in FIG. 3 were: inlet pressure of 200 KPa of the cathode, inlet RH of an anode and of an cathode were both 100%, and a stoichiometric ratio of the anode to the cathode was 2.0. As shown in FIG. 3, the fuel cell had an MEA with gradient performance. At 55° C., the fuel cell had a higher performance of about 20 mV. At 80° C., the fuel cell had a higher performance of about 10 mV. In addition, the dosage of catalyst in Example 1 was lower than that in Example 3, but showed similar performance.

The above description of the examples is only used to facilitate understanding of the method and core concept of the present disclosure. It should be noted that for those skilled in the art, various improvements and modifications may be made without departing from the principle of the present disclosure, and these improvements and modifications should fall within the protection scope of the present disclosure.

Based on the above description of the disclosed examples, those skilled in the art can implement or carry out the present invention. It is apparent for those skilled in the art to make many modifications to these examples. The general principle defined herein may be applied to other examples without departing from the spirit or scope of the present disclosure. Therefore, the present disclosure is not limited to the examples illustrated herein, but should be defined by the widest scope consistent with the principle and novel features disclosed herein.

The invention claimed is:

1. A membrane electrode assembly of a fuel cell, comprising a gas diffusion layer, a microporous layer, a catalytic layer and an electrolyte membrane that are sequentially stacked, wherein
    in the direction of air flow, the thickness of the microporous layer decreases progressively, the thickness of the catalytic layer increases progressively, and the total thickness of the microporous layer and the catalytic layer is uniform;
    wherein the microporous layer has a thickness ranging from 30 μm to 55 μm at an air inlet and has a thickness ranging from 20 μm to 40 μm at an air outlet and the catalytic layer has a thickness ranging from 1 μm to 10 μm at the air inlet and has a thickness ranging from 5 μm to 30 μm at the air outlet
    wherein the difference between the thickness of the catalytic layer at the air outlet and the thickness of the catalytic layer at the air inlet ranges from 1 μm to 20 μm; and the difference between the thickness of the microporous layer at the air inlet and the thickness of the microporous layer at the air outlet ranges from 1 μm to 20 μm; and the microporous layer is made from carbon powder, adhesive agent, dispersant and solvent.

2. The membrane electrode assembly according to claim 1, wherein the total thickness of the microporous layer and the catalytic layer ranges from 20μm to 65μm.

3. A method for preparing the membrane electrode assembly of a fuel cell according to claim 1, comprising:
    A), preparing a microporous layer slurry mixture and a catalytic layer slurry mixture;
    B), coating surface of a gas diffusion layer subjected to hydrophobic treatment with the microporous layer slurry mixture to obtain the microporous layer after heat treatment; and
    coating surface of the electrolyte membrane with the catalytic layer slurry mixture to obtain a membrane/electrode combination after heat treatment, wherein by controlling coating process for the microporous layer and coating process for the membrane/electrode combination respectively, in the direction of air flow, the thickness of the microporous layer decreases progressively, the thickness of the catalytic layer of the membrane/electrode combination increases progressively, and the total thickness of the microporous layer and the catalytic layer is uniform; and
    C), preparing the gas diffusion layer coated with the microporous layer and the membrane/electrode combination coated with the catalytic layer into the membrane electrode assembly.

4. A method for preparing the membrane electrode assembly of a fuel cell according to claim 1, comprising:
    A), preparing microporous layer slurry mixture and a catalytic layer slurry mixture;
    B), coating surface of a gas diffusion layer subjected to hydrophobic treatment with the microporous layer slurry mixture to obtain a microporous layer after heat treatment; and coating surface of the microporous layer with the catalytic layer slurry mixture to obtain a catalytic layer after heat treatment, wherein by controlling coating process for the microporous layer and coating process for the catalytic layer, in the direction of air flow, the thickness of the microporous layer decreases progressively, the thickness of the catalytic layer increases progressively, and the total thickness of the microporous layer and the catalytic layer is uniform; and
    C), preparing the gas diffusion layer, coated with the microporous layer and the catalytic layer, and the electrolyte membrane into the membrane electrode assembly.

5. The method according to claim 3, wherein
    the microporous layer slurry mixture consists of carbon powder, adhesive agent, dispersant and solvent; and
    the catalytic layer consists of carbon supported platinum catalyst, ionomer, dispersant and solvent.

6. The method according to claim 3, wherein
    coating tool for performing the coating process for the microporous layer is a coater with a slit or a spray head, or a scraper; and
    coating tool for performing the coating process for the catalytic layer is a coater with a slit or a spray head, or a scraper.

7. The method according to claim 6, wherein
    in a process of preparing the microporous layer, the thickness of the microporous layer is decreased progressively in the direction of air flow by changing heights of the two ends of the scraper; and
    in a process of preparing the catalytic layer, the scraper is inclined in a direction opposite to that in the process of preparing the microporous layer.

8. The method according to claim 3, wherein the membrane electrode assembly is prepared by hot pressing or bonding.

9. The method according to claim 4, wherein
the microporous layer slurry mixture consists of carbon powder, adhesive agent, dispersant and solvent; and
the catalytic layer consists of carbon supported platinum catalyst, ionomer, dispersant and solvent.

10. The method according to claim 4, wherein
coating tool for performing the coating process for the microporous layer is a coater with a slit or a spray head, or a scraper; and
coating tool for performing the coating process for the catalytic layer is a coater with a slit or a spray head, or a scraper.

11. The method according to claim 4, wherein the membrane electrode assembly is prepared by hot pressing or bonding.

\* \* \* \* \*